United States Patent
Lang et al.

(10) Patent No.: US 6,706,806 B2
(45) Date of Patent: Mar. 16, 2004

(54) POLYESTER PLASTICIZERS FOR HALOGEN-CONTAINING POLYMERS

(75) Inventors: Jiamin Lang, Arlington Heights, IL (US); Franz Josef Luxem, Palatine, IL (US); Bruce E. Streeter, Crystal Lake, IL (US); Bruce E. Stanhope, Grayslake, IL (US); Eric R. Zimmermann, Algonquin, IL (US)

(73) Assignee: Velsicol Chemical Corporation, Rosemont, IL (US)

( * ) Notice: Subject to any disclaimer, the term of this patent is extended or adjusted under 35 U.S.C. 154(b) by 441 days.

(21) Appl. No.: 09/742,260

(22) Filed: Dec. 20, 2000

(65) Prior Publication Data

US 2003/0114564 A1 Jun. 19, 2003

(51) Int. Cl.$^7$ .................................................. C08J 3/00
(52) U.S. Cl. ........................ 524/569; 524/568; 524/81; 524/284; 524/315
(58) Field of Search ................................. 524/569, 568, 524/81, 284, 315

(56) References Cited

U.S. PATENT DOCUMENTS

| | | | | |
|---|---|---|---|---|
| 4,122,057 A | * | 10/1978 | Lamont et al. | 260/31.6 |
| 4,132,696 A | * | 1/1979 | Lamb | 260/31.6 |
| 4,438,228 A | * | 3/1984 | Schenck | 524/109 |
| 6,111,004 A | * | 8/2000 | Biesiada et al. | 524/311 |
| 6,310,128 B1 | * | 10/2001 | Hilti et al. | 524/378 |

OTHER PUBLICATIONS

Abdel–Azim et al., Polymer International, vol. 47, pp. 303–310, (1998).*

J. Wang, et al., Huaxue Shijie (1998) 29(3), pp. 117–120.

S. F. Zawadzki, Polym. –Plast. Technol. Eng. (1993) 32(1–2).

I. A. Sorokina, Plast. Massy (1975) 8, 25–7.

A. Abdel–Azim, Polymer International, 47 (1998) pp. 303–310.

* cited by examiner

Primary Examiner—David W. Wu
Assistant Examiner—Henry Hu
(74) Attorney, Agent, or Firm—Fitch, Even, Tabin & Flannery

(57) ABSTRACT

A portion of the repeating units in polyesters useful as plasticizers for rigid organic polymers are derived from diethylene glycol and at least one dicarboxylic acid. The percentage of these repeating units that can be present in polyesters that are compatible with the organic polymer into which they are incorporated is inversely proportional to the weight average molecular weight of the polyester.

17 Claims, No Drawings

POLYESTER PLASTICIZERS FOR HALOGEN-CONTAINING POLYMERS

BACKGROUND OF THE INVENTION

1. Field of the Invention

This invention relates to polymeric plasticizers. More particularly, this invention relates to polyester type plasticizers wherein a portion of the repeating units are derived from diethylene glycol and at least one dicarboxylic acid.

2. Description of the Prior Art

Plasticizers are well known groups of chemical compounds useful for imparting flexibility, processability and other desirable properties to a variety of materials, including but not limited to organic polymers. Plasticizers are particularly useful for organic polymers that are inherently rigid and difficult to process. Widely used polymers of this type are derived at least in part from ethylenically unsaturated halogenated olefins including but not limited to vinyl- and vinylidene halides such as vinyl chloride and vinylidene chloride.

Desirable properties of plasticizers include efficiency, low permanence and compatibility. An efficient plasticizer will impart its desirable properties at a relatively low concentration, typically 50 weight percent or less, based on the total weight of the polymer composition.

Plasticizers are typically classified as monomeric or polymeric. Polymeric plasticizers are preferred for certain applications, because they are typically less volatile and less easily extracted by water, detergents, oil and organic solvents from polymers into which they have been incorporated. In addition to these desirable properties the plasticizer should be compatible with the polymer into which it is incorporated. Incompatibility typically appears as migration of the plasticizer to the surface of the polymer into which it has been incorporated. In addition to adversely affecting the appearance of the polymer and wetting surfaces in contact with the polymer, incompatibility between polymer and plasticizer typically results in a loss of desirable properties such as flexibility.

The preparation of polyesters from adipic acid, 1,2-propanediol and diethylene glycol is described by J. Wang et al. in Huaxue Shijie [(1998) 29(3), pp. 117–120. The use of these polyesters as plasiticizers for polyvinyl chloride or other polymers is not disclosed.

The use of liquid polyesters prepared using diethylene glycol and at least one dicarboxylic acid as polymeric plasticizers is reported in the literature. S. F. Zawadzki [Polym. -Plast. Technol. Eng. (1993) 32(1–2) pp.155–165] reports that although these polyesters are only slightly compatible with polyvinyl chloride, the plasticizing properties exhibited by these polyesters can be utilized by employing them as secondary plasticizers in combination with other known plasticizers for vinyl chloride polymers.

I. A. Sorokina [Plast. Massy (1975) 8, 25–7] reports that the poor compatibility with polyvinyl chloride of polyesters prepared using adipic acid and diethylene glycol can be improved by replacing the hydroxyl end groups of the polymer with —$CH_2CH_2OC(O)C_nH_{2n+1}$ groups.

The use as plasticizers for polyvinyl chloride of copolymers prepared by reacting diethylene glycol, 1,3-butanediol and either adipic or phthalic acid is described by A. Abdel-Azim in Polymer International, 47 (1998) pp. 303–310.

Polymeric plasticizers prepared using blends of 1,2-propanediol (1) and 2-methylpropane-1,3-diol (2) and aliphatic dicarboxylic acids containing from 6 to 14 carbon atoms are described in U.S. Pat. No. 6,111,004, issued to Keith Biesiada et al. on Aug. 29, 2000. The molar ratios of (1) to (2) used to prepare the polymers is from 1:3 to 3:1 and the polymers contain from 1 to 12 repeating units per molecule.

The present inventors have discovered that a relatively broad class of difunctional alcohols can be used in combination with diethylene glycol and at least one dicarboxylic acid to prepare polyesters that are efficient yet economical primary plasticizers for homo- and copolymers prepared using halogenated olefins such as vinyl chloride.

Preferred embodiments of the present plasticizers exhibit improved physical properties, including low viscosity. Polymer compositions containing these plasticizers exhibit a higher surface energy, lower glass transition temperature and greater low temperature flexibility relative to compositions containing prior art polyesters as plasticizers.

SUMMARY OF THE INVENTION

This invention provides liquid polyester plasticizers, wherein the repeating units of said polyester comprise (I) —$OCH_2CH_2OCH_2CH_2OC(O)R^1(O)C$—, and (II) —$OR^2OC(O)R^1(O)C$—, the terminal groups of said polyester are selected from the group consisting of hydrogen, —$R^3$ and —$C(O)R^4$ and are bonded to an oxygen atom, $R^1$ is at least one member selected from the group consisting of a single bond, alkylene containing from 1 to 20 carbon atoms, cycloalkylene, and ortho-, meta- and para-phenylene; $R^2$ is at least one member selected from the group consisting of alkylene, cycloalkylene and oxyalkylene radicals, wherein said alkylene and oxyalkylene radicals contain from 2 to 8 carbon atoms with the proviso that $R^2$ is not —$CH_2CH_2OCH_2CH_2$— or —$CH_2CH_2CH(CH_3)$—; $R^3$ and $R^4$ are individually selected from at least one member of the group consisting of alkyl radicals containing from 1 to 20 carbon atoms, cycloalkyl radicals and phenyl radicals; the repeating units of formula I constitute up to 75 percent by mole of the total repeating units in said polyester.

The weight average molecular weights of the present polyesters are typically up to 10,000. The polyesters are useful as plasticizers for rigid organic polymers, particularly for homopolymers and copolymers prepared from at least one halogen-containing olefin. These olefins contain at least one halogen atom and from 2 to 6 or more carbon atoms. Suitable monomers include but are not limited to vinyl chloride, vinylidene chloride, vinylidene fluoride, 1-chloropropene, 1-chloro-2-butene, and tetrafluoroethylene.

The present polyesters are particularly suitable as primary plasticizers for homopolymers and copolymers of vinyl chloride and vinylidene chloride. Polyvinyl chloride and copolymers of vinyl chloride with at least one ethylenically unsaturated compound, such as vinyl acetate, styrene, and maleic and fumaric acids and esters thereof, are preferred for use with the present plasticizers.

The present polyesters are copolymers of diethylene glycol, at least one additional diol and at least one dicarboxylic acid. In addition to being compatible with the polymers into which they are incorporated, preferred embodiments of the present polyesters and polymer compositions containing these polyesters exhibit unexpected desirable properties. The polyesters exhibit a lower viscosity relative to polyesters of similar molecular weight prepared using diols other than diethylene glycol. Polymer compositions containing the present polyesters exhibit a higher surface energy, a lower glass transition temperature, and greater low temperature flexibility relative to compositions containing prior art polyesters.

As discussed in detail in the following paragraphs, the maximum allowable concentration of repeating units derived from diethylene glycol in polyesters that are compatible with halogen-containing polymers such as polyvinyl chloride is inversely proportional to the molecular weight of the polyester. As used in the present specification, "compatible" implies that at a concentration of 50 parts by weight per 100 parts of polyvinyl chloride the polyester will not exude from a strip molded from this composition under the conditions described in ASTM test D-3291. In the examples forming part of this specification, the test procedure was modified by changing the sample size from 12.7×25.4 mm. to 25.4×76.2 mm.

The present inventors have also discovered that in addition to molecular weight the type of terminal unit present in the polyester will also affect the maximum concentration of units derived from diethylene glycol that can be present in a compatible polyester.

For the purposes of the present invention, the weight average molecular weight of polyesters referred to herein as high molecular weight polymers is typically from 5,500 to about 10,000, polymers exhibiting molecular weights from 2,000 to about 5,500 are referred to as medium molecular weight polymers, and those exhibiting molecular weights below 2,000 are considered low molecular weight polymers.

For high molecular weight polyesters, repeating units derived from diethylene glycol can constitute up to about 40 percent of the total of all repeating units when the terminal unit is derived from an alcohol $R^3OH$. The upper concentration of diethylene glycol derived units is reduced to below 30 percent when the terminal unit is derived from a monocarboxylic acid $R^4C(O)OH$. $R^3$ and $R^4$ are as defined hereinbefore.

For medium and low molecular weight polyesters, when the terminal units are derived from a monohydric alcohol, polymers wherein therefore up to 75 percent of the repeating units are derived from diethylene glycol are compatible with polyvinyl chloride. The polyesters of this invention are typically prepared by reacting diethylene glycol with at least one dicarboxylic acid and at least one of the additional difunctional alcohols, also referred to in this specification as "diols" or "glycols", that will yield a plasticizer of the present invention. When the terminal group of the polyester is represented by $-R^3$ or $-C(O)R^4$, a monofunctional alcohol $R^3OH$ or a monocarboxylic acid $R^4C(O)OH$ is included as a reactant. In the preceding formula $R^3$ and $R^4$ individually represent alkyl containing from 1 to 20 carbon atoms, a cylcoalkyl radical or a phenyl radical.

Suitable diols contain from 2 to 10 or more carbon atoms, and can be represented by the formula $HOR^2OH$. In this formula $R^2$ is at least one alkylene, oxyalkylene and/or cycloalkylene radical, with the proviso that it cannot be $-CH_2CH_2OCH_2CH_2-$ (the residue of diethylene glycol), or $-CH_2CH_2CH(CH_3)-$ (the residue of 1,3-butanediol) because the use as plasticizers of a polyester prepared from a combination of diethylene glycol with 1,3-butanediol is reported in the literature discussed in the prior art section of this specification. These polyesters are therefore excluded from the plasticizers of the present invention.

Preferably $R^2$ is at least one member selected from the group consisting of alkylene containing from 2 to 10 carbon atoms and oxyalkylene containing from 4 to 8 carbon atoms. Preferred diols include but are not limited to ethylene glycol, 1,2-propanediol (also referred to in this specification as propylene glycol), 1,3-propanediol, 1,2-butanediol, 1,4-butanediol, 2-methyl-1,3-propanediol, neopentyl glycol and dipropylene glycol.

A mixture of diethylene glycol and at least one of the diols of this invention is reacted with a substantially equimolar amount of a dicarboxylic acid or a combination of two or more of these acids.

For the purposes of the present invention, the dicarboxylic acid reactant is represented by the formula $HO(O)CR^1C(O)OH$. In this formula $R^1$ represents at least one member selected from the carbon-carbon single bond, alkylene containing from 1 to 20 carbon atoms, cycloalkylene and ortho-, meta- and para-phenylene. $R^1$ is preferably alkylene containing from 2 to 10 carbon atoms or one of the isomeric phenylene radicals, most preferably $-(CH_2)_4-$, p-phenylene or a combination thereof.

Useful dicarboxylic acids include but are not limited to oxalic acid, maleic acid, 1,4-butanedioic acid, adipic acid, 1,4-cyclohexanedioic acid and the isomeric phthalic acids.

When it is desired include a monofunctional alcohol $R^3OH$ or a monocarboxylic acid $R^4COOH$ as a chain terminating reactant, this reactant can be added together with the dicarboxylic acid and diol. Alternatively, the monofunctional reactant can be added following completion of the polymerization reaction.

In the formulae for the monofunctional reactants, $R^3$ and $R^4$ are each at least one member selected from the group consisting of alkyl radicals containing from 1 to 20 carbon atoms, cycloalkyl and phenyl radicals. $R^3$ is preferably an alkyl radical containing from 1 to 12 carbon atoms and $R^4$ is preferably alkyl containing 1 to 12 carbon atoms or a phenyl radical.

Preferred monofunctional alcohols include but are not limited to methanol, ethanol, 1-propanol, 2-ethyl-1-hexanol and isononyl alcohol. Preferred monocarboxylic acids contain at least 6 carbon atoms and include but are not limited to 1-hexanoic, palmitic and benzoic acids.

The relative concentrations of mono- and difunctional reactants in the reaction mixture are determined by the desired molecular weight of the polymer. For the polyesters of this invention the concentration of monofunctional acid and/or alcohol in the reaction mixture is typically from 5 to about 32 mole percent, based on the corresponding difunctional reactant(s).

The diethylene glycol, additional diol(s) and any desired monofunctional reactants are reacted with at least one dicarboxylic acid under conditions typical for the preparation of polyesters. Because esterification is typically an equilibrium reaction, the reaction is conducted at the boiling point of the reaction mixture. Water, the by-product of an esterification reaction using a carboxylic acid rather than a derivative thereof such as the corresponding anhydride, is typically the lowest boiling material in the reactor. Equipping the reactor with a suitable trap, such as a Dean-Stark trap, located below the reflux condenser allows liquid water to be collected and removed from the reaction mixture. Under the law governing equilibrium reactions, removal of a reaction product forces the reaction toward formation of the desired polyester.

Preferably the ratio of the total number of moles of dicarboxylic acid(s) to total moles of diols in the reactor is from 1:0.89 to 1:1.18 and the reaction is conducted under an inert atmosphere such as nitrogen.

The rate of esterification reactions is typically accelerated in the presence of a suitable catalyst. Preferred catalysts include but are not limited to organic titanates such as tetrabutyl titanate, organotin compounds such as dibutyltin oxide and organic sulfonic acids such as p-toluenesulfonic acid.

The course of the polyesterification reaction can be followed by measuring the quantity of water evolved as a by-product and/or by periodically determining the concentration of unreacted hydroxyl and/or carboxyl groups in the reaction mixture. Using laboratory scale equipment a polyesterification reaction conducted in accordance with the present invention typically requires from 10 to 12 hours.

Methods for isolating and purifying polyesters are sufficiently well known and described in the literature that a detailed description of these methods in the present specification is not required. All of the present polyester plasticizers are liquids at 25° C. and do not boil below a temperature of about 200° C. under a pressure of 10 mm. of mercury. These polymers can be poured from the reactor following removal by distillation under reduced pressure of any unreacted starting materials and lower boiling by-products. If the reaction residue is colored due to the presence of impurities, the color can usually be removed by treatment with a decolorizing agent such as activated charcoal or an oxidizing agent such as hydrogen peroxide.

Ester and polyester type plasticizers are typically blended with halogen-containing polymers such as homopolymers and copolymers of vinyl chloride to improve the flexibility and processability of these polymers. To be effective the concentration of polyester is typically from about 5 to about 150 parts by weight per 100 parts by weight of halogen-containing polymer. At these concentration levels the plasticizer and polymer must be compatible.

Because diethylene glycol is typically less expensive than other diols, replacing repeating units derived from other diols with units derived from diethylene glycol can considerably lower the cost of a polyester plasticizer.

The polyester plasticizers of the present invention are readily blended with polyvinyl chloride or other polymer using known techniques employed to distribute additives uniformly within a polymer matrix. These techniques include but are not limited to the use of mixers, extruders, kneaders and roller mills.

The following examples describe the preparation and evaluation as plasticizers of preferred polyesters of the present invention. These examples should not be interpreted as limiting the scope of the present invention as defined in the accompanying claims.

EXAMPLE 1

This example describes the preparation and evaluation of low, medium and high molecular weight polyesters of the present invention.

The following procedure was used to prepare all of the polyesters of the present invention.

A glass reactor was equipped with a mechanically driven stirrer, a 30 inch (75 cm.)-long glass fractionating column 1 inch (2.5 cm.) in diameter and packed with glass helices, a water-cooled reflux condenser, a trap for collecting the condensate from the condenser, and a nitrogen inlet. The lower end of the trap was connected to the upper end of the fractionating column.

The reactor was charged with diethylene glycol (DEG), the additional diol reactant and any monofunctional alcohol. Gradual heating and stirring of the reactor contents to 100° C. was then begun together with gradual addition of the dicarboxylic acid reactant and the monofunctional carboxylic acid or alcohol. The molar ratio of dicarboxylic acid to total diols was 1.12 for all of the reactions. Following addition of the acid(s) 0.63 gram of dibutyltin oxide was added as the catalyst followed by 70 cc of toluene.

All of the polyesters with the exception of the one identified as number 12 in the following Table 1 were prepared using adipic acid as the dicarboxylic acid. Polyester number 12 was prepared using phthalic acid.

The reactor port through which the reactants were added was then closed, a flow of nitrogen begun below the surface of the reaction mixture and the reaction mixture was heated to the boiling point, typically from 135 to 175° C. The volume of water that collected in the trap was measured before being discarded. Following one hour of heating, samples of the reaction mixture were taken every 30 minutes for determination of its acid number. When the acid number reached a value in the range of from 15 to 25, the hydroxyl number of the reaction mixture was then also measured. Additional acid or diol mixture was then added as required until a hydroxyl number of approximately 20 was achieved. Heating of the reaction mixture at the boiling point was continued until the acid number reached a value in the range of from 1.8 to 2.2. At this time the flow rate of nitrogen was increased to about one standard cubic foot per hour and the toluene was distilled from the reaction mixture. When the distillation rate decreased the pressure in the reactor was gradually lowered from atmospheric to a final value of from 10 to 20 mm. of mercury. The reaction mixture temperature was allowed to increase to 220–230° C. and maintained at this level for one hour to complete the removal of toluene, water, excess reactants and/or oligomeric products.

If the color value of the polyester was greater than 150 on the APHA scale the polyester was treated with hydrogen peroxide at a temperature of from 95 to 110° C. for between 30 and 45 minutes with stirring. All of the reaction mixtures were then heated to a temperature of 135° C. and the pressure in the reactor was reduced to from 10 to 20 mm Hg for the time required for the moisture content of the reactor contents to decrease to below 0.2%. The residue in the reactor, consisting essentially of the desired polyester, was then removed from the reactor. All of the polyesters were then filtered through Cellite®.

The viscosity of each polyester was then measured at 50° C. and recorded in units of Pascal seconds (Pa.s). The weight average molecular weights of the polyesters were determined by gel permeation chromatography.

The compatibility of each polyester with polyvinyl chloride was determined by blending 50 parts by weight of the polyester with 100 parts by weight of a polyvinyl chloride resin available as OXY 225, 2.0 parts of a heat stabilizer available as Therm-Chek® 5444A and 0.5 parts of stearic acid as a lubricant. The resultant mixtures were then processed for seven minutes on a two-roll mill maintained at a temperature of 182° C. The resultant sheets were then compression molded for 6 minutes at 182° C. to form squares measuring 6 inches (15 cm.) on each side and from 0.070 to 0.075 inch (1.7 to 1.9 mm.) in thickness.

Samples measuring 1×3 inches (2.54×7.62 cm.) were cut from the compressed sheets and evaluated to determine the compatibility of the plasticizer with the polyvinyl chloride. The samples were tested in accordance with the procedure described in ASTM test no. D 3291-92. The samples were than examined to determine whether any plasticizer had exuded from the polymer.

The amount of exuded liquid was rated on a scale of from 1 (trace amount of liquid present), to 3 (surface covered with liquid exudate)

The types and amounts of reactants used to prepare the polyesters are summarized in the following Table 1. The names of the reactants are abbreviated as follows:

DEG—Diethylene glycol
PG—1,2-Propanediol (Propylene Glycol)
MPD—2-Methyl-1,3-propanediol
2-EH—2-Ethylhexanol
BA—Benzoic Acid
PAL—Palmitic Acid
1,4 BD—1,4-Butanediol
1,3 BD—1,3-Butanediol
DPG—Dipropylene Glycol Medium Molecular Weight Polyesters Polyester 6 did not contain any repeating units derived from diethylene glycol, and was therefore compatible with polyvinyl chloride.

Polyester 9, evaluated for comparative purposes, was prepared using a 3:1 molar ratio of diethylene glycol to propylene glycol, which is above the limit for medium molecular weight polyesters. When blended with polyvinyl chloride a small amount of the polyester exuded from the polymer during molding.

Polyesters 7, 8 and 10 are polyesters of the present invention and were compatible with polyvinyl chloride.

Low Molecular Weight Polyesters

TABLE 1

| Polyester No. | DEG (g//mol) | Diol (type//g//mol) | DEG/Diol Mole Ratio | Monoalcohol/monoacid (type//g//mol) | Polyester Visc*//MW |
|---|---|---|---|---|---|
| High Molecular Weight Polyesters | | | | | |
| 1 (Control) | None | 1,3 BD | 0:1 | PAL | 1.21/6000 |
| 2 (Control) | 853.2/8 | MPD/725.5/8 | 1:1 | BA/244.2/2 | 1.00/8789 |
| 3 (Control) | 678.9/6.40 | None | 1:0 | PAL/79.8/0.7 | 0.79/6972 |
| 4 (Control) | 511.9/4.8 | MPD/1,014/11.2 | 3:7 | BA/244.2/2 | 1.07/5515 |
| 5 | 251.5/2.37 | DPG/741.8/5.53 | 3:7 | 2-EH/136.5/1.05 | 0.9/5752 |
| Medium Molecular Weight Polyesters | | | | | |
| 6 (Control) | None | PG + 1,4-BD | 0:1 | 2-EH | 0.23/3000 |
| 7 | 273.3/2.57 | PG/196/2.58 | 1:1 | 2-EH/314.0/2.41 | 0.17/3114 |
| 8 | 136.7/1.29 | PG/294.0/3.86 | 1:3 | 2-EH/314.0/2.41 | 0.15/2794 |
| 9 (Control) | 410.3/3.86 | PG/98.07/1.29 | 3:1 | 2-EH/314.0/1.57 | 0.18/2939 |
| 10 | 273.3/2.58 | DPG/345.6/2.58 | 1:1 | 2-EH/314.9/1.57 | 0.19/3246 |
| Low Molecular Weight Polyesters | | | | | |
| 11 [Control] | None | PG/1,4 BD (1:1) | 0:1 | 2-EH | 0.61/1200 |
| 12** [1910] | 176.3/1.7 | PG 132.9/1.75 | 1:1 | 2-EH/451.1/3.5 | 0.6/1420 |

*Pa · s @ 50° C.
**Prepared using o-phthalic acid as the dicarboxylic acid

High Molecular Weight Polyesters

Polyester 1 did not contain any units derived from diethylene glycol and was evaluated to demonstrate the lower viscosity and other desirable physical properties of polyesters prepared using diethylene glycol. This polyester was compatible with the polyvinyl chloride.

Polyesters 2 and 4 were high molecular weight polyester prepared using diethylene glycol and 2-methyl-1,3-propanediol with benzoic acid as the monofunctional reactant and were evaluated for comparative purposes. The molar ratio of diethylene glycol to the other diol was 1:1 in polyester 2 and 3:7 in polyester 3. Both of these polymers exuded from polyvinyl chloride during the compatibility evaluation.

Polyester 3 was prepared using palmitic acid in place of benzoic acid as the monofunctional carboxylic acid and diethylene glycol as the sole diol. This polyester demonstrates that changing the monocarboxylic reactant does not affect incompatibility of a polyester prepared using diethylene glycol as the sole diol reactant.

Polyester 5, a polyester of the present invention, was prepared using diethylene glycol and dipropylene glycol in a molar ratio of 3:7, however in this instance the monofunctional reactant was an alcohol, 2-ethylhexanol, instead of benzoic acid. This polyester was compatible with polyvinyl chloride. This sample demonstrates the preference for monohydric alcohols rather than monocarboxylic acids for relatively high molecular weight polyesters of the present invention.

All of the polyesters evaluated were compatible with polyvinyl chloride.

The data in Table 1 also demonstrates the lower viscosities exhibited by the present polyesters relative to similar polyesters of comparable molecular weight.

The high molecular weight polyester used for comparative purposes (identified as polyester 1 in Table 1) exhibited a number average molecular weight of about 6000 and a viscosity of 1.2 Pa.s at 50° C. Polyester 4 in Table 1, a polyester of the present invention, exhibited a similar molecular weight (5752) and a lower viscosity of 0.9 Pa.s at 50° C.

Polyester 6, the medium molecular weight polyester used for comparative purposes, was prepared using adipic acid as the dicarboxylic acid, a 1/1 molar mixture of 1,4-butanediol and propylene glycol as the diols and 2-ethylhexanol as the monohydric alcohol. The number average molecular weight of this polyester was about 3000 and its viscosity was 0.23 Pa.s

EXAMPLE 2

This example demonstrates the higher surface energy, lower glass transition temperature (Tg) and lower brittleness temperature exhibited by polyvinyl chloride compositions containing the diethylene glycol-containing polyesters of the present invention relative to polyvinyl chloride compositions containing similar prior art polyesters.

A lower glass transition temperature is typically associated with a lower brittleness temperature. Both contribute to a higher degree of flexibility of the plasticized polymer at lower temperatures.

The polyvinyl chloride samples were prepared as described in the preceding Example 1 with the exceptions that stearic acid, a conventional lubricant, was omitted from the composition and the thickness of the samples evaluated for surface energy was 0.025 inch (0.064 cm) and the samples evaluated for glass transition temperature (Tg) and brittleness temperature were 0.075 inch (0.19 cm.) thick. The results of these evaluations are recorded in the following Table 2.

TABLE 2

| Polyester (from Table 1) | Tg (° C.)* | Brittleness Temperature (° C.) | Surface Energy (Dynes/cm.) |
|---|---|---|---|
| 6 [Control] | −19.6° | −20.5° | 37.7 |
| 7 | −26.6° | −25.5° | 39.0 |
| 8 | −22.7° | −23.0° | NE |

*= measured using differential scanning calorimetry
NE = Not Evaluated

That which is claimed is:

1. A liquid polyester plasticizer wherein the repeating units of said polyester comprise (I) —OCH$_2$CH$_2$OCH$_2$CH$_2$OC(O)R$^1$(O)C—, and (II) —OR$^2$OC(O)R$^1$(O)C—; the terminal groups of said polyester are selected from the group consisting of —R$^3$ and —C(O)R$^4$ and are bonded to an oxygen atom; R$^1$ is at least one member selected from the group consisting of a single bond, alkylene containing from 1 to 20 carbon atoms, cycloalkylene, and ortho-, meta- and para-phenylene; R$^2$ is at least one member selected from the group consisting of alkylene, cycloalkylene and oxyalkylene with the proviso that R$^2$ is not —CH$_2$CH$_2$OCH$_2$CH$_2$— or —CH$_2$CH$_2$CH(CH$_3$)—; R$^3$ and R$^4$ are individually selected from at least one member of the group consisting of alkyl radicals containing from 1 to 20 carbon atoms, cycloakyl radicals and the phenyl radical; and repeating units of formula I constitute up to 75 percent by mole of the repeating units of said polyester.

2. A plasticizer according to claim 1 wherein the maximum concentration of said repeating units of formula I is inversely proportional to the weight average molecular weight of said polyester, and the weight average molecular weight of said polyester is up to 10,000.

3. A plasticizer according to claim 1 wherein R$^1$ is at least one member selected from the group consisting of alkylene containing from 2 to 10 carbon atoms and ortho-, meta-, and para-phenylene, R$^2$ is at least one member selected from the group consisting of alkylene containing from 2 to 10 carbon atoms and oxyalkylene containing from 4 to 8 carbon atoms, R$^3$ is at least one member selected from the group consisting of alkyl radicals containing from 1 to 12 carbon atoms and R$^4$ is at least one member selected from the group consisting of R$^3$ and phenyl.

4. A plasticizer according to claim 3 wherein R$^1$ is selected from the group consisting of —(CH$_2$)$_4$—, p-phenylene, and combinations thereof, R$^2$ is at least one member selected from the group consisting of —CH(CH$_3$)CH$_2$—, —CH$_2$CH$_2$—, —CH$_2$CH$_2$CH$_2$—, —CH$_2$CH$_2$CH$_2$CH$_2$— —CH$_2$C(C$_2$H$_5$)H—, —CH$_2$CH(CH$_3$)CH$_2$—, —CH$_2$C(CH$_3$)$_2$CH$_2$— and —CH$_2$CH(CH$_3$)OCH(CH$_3$)CH$_2$—; R$^3$ is 2-ethylhexyl, and R$^4$ is phenyl.

5. A plasticizer according to claim 1 wherein the number average molecular weight of said polyester is from 5,500 to 10,000, said terminal group is —R$^3$ and repeating units of formula I constitute up to 40 percent by mole of the repeating units present in said polyester.

6. A plasticizer according to claim 1 wherein the number average molecular weight of said polyester is from 2,000 to 5,500, said terminal group is —R$^3$ and repeating units of formula I constitute up to 55 percent by mole of the repeating units present in said polyester.

7. A plasticized polymer composition comprising a polymer derived at least in part from at least one halogen-containing ethylenically unsaturated hydrocarbon; and as the plasticizer, at least one polyester comprising repeating units of the formulae (I) —OCH$_2$CH$_2$OCH$_2$CH$_2$OC(O)R$^1$(O)C—, and (II) —OR$^2$OC(O)R$^1$(O)C—, and terminal groups selected from the group consisting of —R$^3$ and —C(O)R$^4$, wherein said terminal groups are bonded to an oxygen atom; R$^1$ is at least one member selected from the group consisting of a single bond, alkylene containing from 1 to 20 carbon atoms, cycloalkylene, and ortho-, meta- and para-phenylene; R$^2$ is at least one member selected from the group consisting of alkylene, cycloalkylene and oxyalkylene with the proviso that R$^2$ is not —CH$_2$CH$_2$OCH$_2$CH$_2$— or —CH$_2$CH$_2$CH(CH$_3$)—; R$^3$ and R$^4$ are individually selected from at least one member of the group consisting of alkyl radicals containing from 1 to 20 carbon atoms, cycloakyl radicals and the phenyl radical; and repeating units of formula I constitute up to 75 percent by mole of the repeating units of said polyester.

8. A polymer composition according to claim 7 wherein the maximum concentration of said repeating units of formula I is inversely proportional to the weight average molecular weight of said polyester, and the weight average molecular weight of said polyester is up to 10,000.

9. A polymer composition according to claim 7 wherein R$^1$ is at least one member selected from the group consisting of alkylene containing from 2 to 10 carbon atoms and at least one of the isomeric phenylenes, R$^2$ is at least one member selected from the group consisting of alkylene containing from 2 to 10 carbon atoms and oxyalkylene containing from 4 to 8 carbon atoms, R$^3$ is at least one member selected from the group consisting of alkyl radicals containing from 1 to 12 carbon atoms and R$^4$ is at least one member selected from the group consisting of R$^3$ and phenyl.

10. A polymer composition according to claim 9 wherein R$^1$ is selected from the group consisting of —(CH$_2$)$_4$—, p-phenylene, and combinations thereof, R$^2$ is at least one member selected from the group consisting of —CH(CH$_3$)CH$_2$—, —CH$_2$CH$_2$—, —CH$_2$CH$_2$CH$_2$—, —CH$_2$CH$_2$CH$_2$CH$_2$—, —CH$_2$C(C$_2$H$_5$)H—, —CH$_2$CH(CH$_3$)CH$_2$—, —CH$_2$C(CH$_3$)$_2$CH$_2$— and —CH$_2$CH(CH$_3$)OCH(CH$_3$)CH$_2$—; R$^3$ is 2-ethylhexyl, and R$^4$ is phenyl.

11. A polymer composition according to claim 7 wherein the weight average molecular weight of said polyester is from 5,500 to 10,000, said terminal group is —R$^3$ and repeating units of formula I constitute up to 40 percent by mole of the repeating units present in said polyester.

12. A polymer composition according to claim 7 wherein the weight average molecular weight of said polyester is from 2,000 to 5,500, said terminal group is —R$^3$ and repeating units of formula I constitute up to 55 percent of the repeating units present in said polyester.

13. A polymer composition according to claim 7 wherein said halogen-containing ethylenically unsaturated hydrocarbon is selected from the group consisting of vinyl chloride and vinylidene chloride.

14. A polymer composition according to claim 13 wherein said halogen-containing unsaturated hydrocarbon is vinyl chloride.

15. A polymer composition according to claim 14 wherein said polymer is selected from the group consisting of polyvinyl chloride and copolymers of vinyl chloride with at least one compound selected from the group consisting of vinyl acetate, maleic and fumaric acids and esters, and styrene.

16. A liquid polyester plasticizer wherein the repeating units of said polyester comprise (I) —OCH$_2$CH$_2$OCH$_2$CH$_2$OC(O)R$^1$(O)C—, and (II) —OR$^2$OC(O)R$^1$(O)C—; the terminal groups of said polyester are H; R$^1$ is at least one member selected from the group consisting of a single bond, alkylene containing from 1 to 20 carbon atoms, cycloalkylene, and ortho-, meta- and para-phenylene; R$^2$ is at least one member selected from the group consisting of alkylene, cycloalkylene and oxyalkylene with the proviso that R$^2$ is not —CH$_2$CH$_2$OCH$_2$CH$_2$— or —H$_2$CH$_2$CH(CH$_3$)—; repeating units of formula I constitute up to 75 percent by mole of the repeating units of said polyester; and the maximum concentration of said repeating units of formula I is inversely proportional to the weight average molecular weight of said polyester, and the average weight of said polyester is up to 10,000.

17. A plasticized polymer composition comprising a polymer derived at least in part from at least one halogen-containing ethylenically unsaturated hydrocarbon; and as the plasticizer, at least one polyester comprising repeating units of the formulae (I) —OCH$_2$CH$_2$OCH$_2$CH$_2$OC(O)R$^1$(O)C—, and (II) —OR$^2$OC(O)R$^1$(O)C—, and terminal groups selected from the group consisting of —R$^3$ and —C(O)R$^4$, wherein said terminal groups are bonded to an oxygen atom; R$^1$ is at least one member selected from the group consisting of a single bond, alkylene containing from 1 to 20 carbon atoms, cycloalkylene, and ortho-, meta- and para-phenylene; R$^2$ is at least one member selected from the group consisting of alkylene, cycloalkylene and oxyalkylene with the proviso that R$^2$ is not —CH$_2$CH$_2$OCH$_2$CH$_2$— or —CH$_2$CH$_2$CH(CH$_3$)—; repeating units of formula I constitute up to 75 percent by mole of the repeating units of said polyester; the maximum concentration of said repeating units of formula I is inversely proportional to the weight average molecular weight of said polyester; and the average weight of said polyester is up to 10,000.

* * * * *